July 9, 1929.   P. H. HENKEL   1,720,363
BATTERY BOX
Filed Jan. 6, 1928

Paul H. Henkel
INVENTOR.

BY
ATTORNEYS.

Patented July 9, 1929.

1,720,363

UNITED STATES PATENT OFFICE.

PAUL H. HENKEL, OF ERIE, PENNSYLVANIA, ASSIGNOR TO CONTINENTAL RUBBER WORKS, OF ERIE, PENNSYLVANIA, A CORPORATION OF PENNSYLVANIA.

BATTERY BOX.

Application filed January 6, 1928. Serial No. 244,843.

In types of battery boxes it is desirable to be able to ascertain the condition of the battery from observation. This has been accomplished in the past by making transparent battery boxes, arranging a gravity indicator within the transparent walls which could be readily observed from without the wall without opening, or disturbing the battery. Such containers are more or less fragile and expensive. The present invention is designed to form a container of ordinary plastic compounds having an opening with a transparent closure in its walls. Such an arrangement must be acid-tight and capable of being fabricated in the plastic material. Details and features of the invention will appear more fully from the specification and claims.

A preferred embodiment of the invention is illustrated in the accompanying drawings as follows:—

Figure 1:
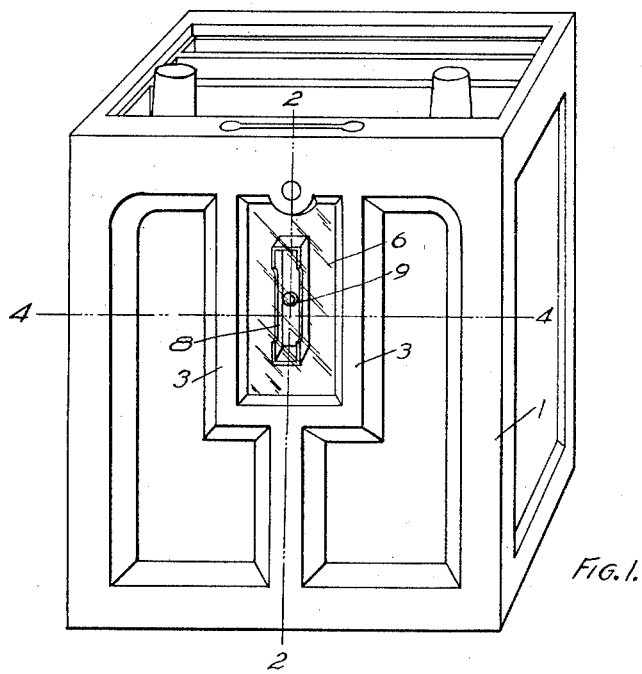

Fig. 1 shows a perspective view of the container with the improved opening.

Figure 2:
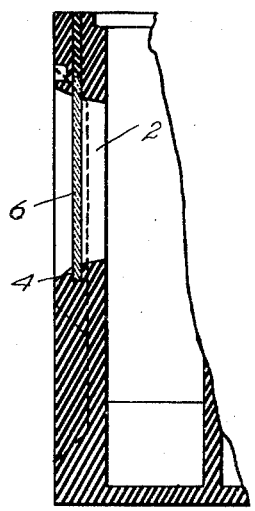

Fig. 2 a section on the line 2—2 in Fig. 1.

Figure 3:
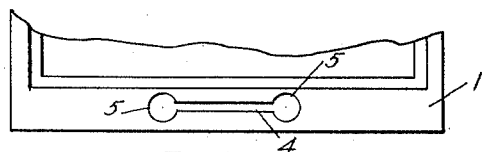

Fig. 3 a top view of one of the walls.

Figure 4:
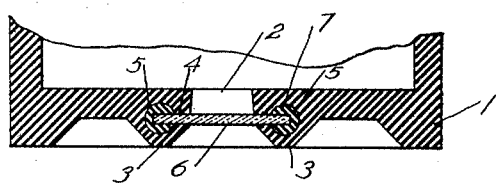

Fig. 4 a section on the line 4—4 in Fig. 1.

1 marks the walls of the container. One of the side walls has an opening 2. This is preferably surrounded by a rib 3 formed in the wall.

A slot 4 is arranged in the wall around the opening 2. This slot has vertical enlargements 5 at each side of the opening. The slot extends to the top of the wall. A transparent plate 6, as glass, is inserted into the slot from the top of the wall. A sealing material 7 is arranged in the bottom portion of the slot before the glass is inserted and the same material is introduced into the enlargements 5 after the glass is inserted and this sealing material is also filled in the slot above the opening. This may be a sealing material which is fluid when hot and which will harden as it cools but any suitable sealing material may be used.

A cage 8, such as is ordinarily used in these batteries, is mounted within the transparent plate and a gravity ball 9 is arranged in this cage.

With this structure it has been found possible not only to form a container with the necessary slots as indicated but also to so seal the glass as to make the same liquidtight. The container is also of its usual strength and can be made more economically than the all glass container.

What I claim as new is:—

1. A battery box formed of plastic material having an opening through a side wall of the box and below the upper edge thereof, a slot in the edge of the opening, said slot extending through the top of the wall including the edge above the opening; and a transparent closure for the opening inserted into the slot from the top.

2. A battery box formed of plastic material having an opening through a side wall of the box and below the upper edge thereof, a slot in the edge of the opening, said slot extending through the top of the wall including the edge above the opening; a transparent closure for the opening inserted into the slot from the top; and a sealing material in the slot.

3. A battery box formed of plastic material having an opening through a side wall of the box, a slot in the edge of the opening, said slot extending through the top of the wall, the slot at the sides of the opening being enlarged forming vertical channels; a transparent closure for the opening inserted into the slot from the top; and a sealing material in the slot.

4. A battery box formed of plastic material having an opening through a side wall of the box and below the upper edge thereof, a slot in the edge of the opening, said slot extending through the top of the wall including the edge above the opening, the slot at the sides of the opening being enlarged forming vertical channels; a transparent closure for the opening inserted into the slot from the top; and a sealing material in the slot.

In testimony whereof I have hereunto set my hand.

PAUL H. HENKEL.